Patented Aug. 8, 1944

2,355,496

UNITED STATES PATENT OFFICE 2,355,496

DIOXAZINE-TYPE DYESTUFFS AND PROCESS FOR PREPARING THE SAME

Frithjof Zwilgmeyer, Wilmington, Del., assignor to E. I. du Pont de Nemours & Company, Wilmington, Del., a corporation of Delaware No Drawing. Application February 13, 1943, Serial No. 475,803

6 Claims. (Cl. 260—246)

This invention relates to novel dyestuff compounds suitable for dyeing cotton and other textiles, and to a process of preparing the same. More particularly, this invention deals with novel dioxazine-type dyestuffs which are obtainable by causing oleum, sulfuric acid or chlorosulfonic acid to act upon a compound of the general formula

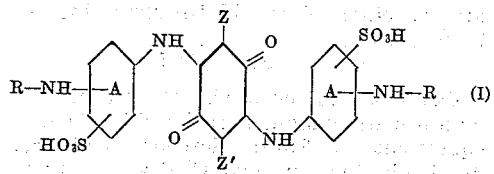

wherein each of the benzene radicals marked A has at least one free ortho-position, and wherein Z and Z' individually represent hydrogen, halogen or alkyl, while R is the radical of a quinoxaline compound attached to the NH group through its Bz-ring. In other words, R is the radical of a compound of the general formula

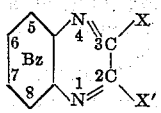

wherein X and X' are each substituents chosen from the group consisting of hydrogen, hydroxy, carboxy, lower alkyl and lower aryl, such as phenyl, and wherein the Bz nucleus may be further substituted, as for instance by halogen, lower alkyl and lower alkoxy radicals.

The treatment of the above type compound with oleum etc., results in closure of the two rings next to the central quinone radical, yielding a dioxazine dyestuff. This effect, however, is accompanied by sulfonation, and in the subsequent treatment of the product, some desulfonation or shifting of the $SO_3H$ groups takes place, as a result of which the formula of the final product is uncertain. The most that can be said about the final product is that it probably corresponds to the general formula

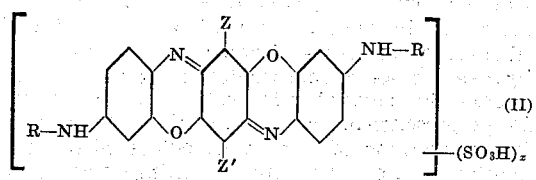

wherein Z, Z' and R have the same significance as above, while $x$ designates an undetermined number, probably not greater than 4.

I have found that these new dioxazine dyes can be obtained in a surprisingly simple manner with good yields. Beside bright shades, excellent exhausting properties, good solubility and washing fastness, these colors have excellent light fastness, which in certain cases can be further improved by treatment to form metal complexes.

The synthesis of my novel compounds may follow in general the prior practice of the art except for the choice of R. In some cases, however, I may include in this process a special after-treatment step with anhydrous HCl (or NaCl+anhydrous $H_2SO_4$) at elevated temperature, as more fully illustrated in Example 1 below. I find that this step enhances the exhausting properties of the final dyestuff, and gives altogether greater tinctorial strength and washing fastness.

Considering now my process in greater detail, the synthesis of my novel dyestuffs may begin by reacting a nitro-halogen-benzene-sulfonic acid, for instance 4-nitro-1-chlorobenzene-2-sulfonic acid, with a Bz-amino quinoxaline of the type $H_2N$—R, wherein R is the radical of a quinoxaline compound as above defined. The condensation is effected by the aid of an acid absorbing agent, and may be expressed by the following typical equation:

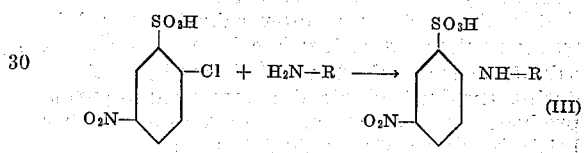

Condensation product III is then subjected to reduction, for instance by the aid of iron and acid, to convert the nitro group into an amino group. Two moles of the reduction product are then condensed in the usual manner with one mole of a benzoquinone selected from the group consisting of benzoquinone, its homologs and halogen derivatives, this condensation again being aided preferably by acid absorbing agents. The result is a compound of formula (I) above.

Finally, the compound of formula (I) above is subjected to ring closure by the aid of sulfuric acid, oleum or chlorosulfonic acid, which results in a dyestuff.

As a special added feature of this invention, I prefer in certain cases to treat the recovered dyestuff by warming it up in concentrated sulfuric acid (96 to 100% strength) containing a small quantity of sodium chloride, or into which dry HCl gas is fed in catalytic proportions. A small quantity of glacial acetic acid (1 to 2% by weight) may also be added.

Without any intent to limit this invention, the following examples are given to illustrate my preferred mode of operation. Parts mentioned are by weight.

*Example 1*

8.2 parts tetra-chloro-benzoquinone (chloranil) are reacted with 23 parts of the compound represented by the formula:

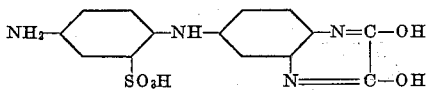

and obtained as described below. The condensation of this intermediate with choranil is carried out by refluxing the components in the presence of 10.8 parts of sodium acetate (anhydrous), or 11 parts of sodium bicarbonate, and 200 parts of alcohol for 16 hours. The reaction product is then filtered off hot and the filter cake is washed with 50 parts of hot alcohol and dried. 20 parts of a dark condensation product is obtained, which is nearly insoluble in alcohol, and which may be represented by the probable formula:

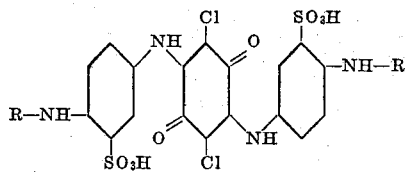

wherein R designates the radical of 2,3-dihydroxy-quinoxaline, that is

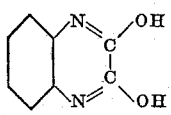

5 parts of this condensation product are added slowly to 100 parts of fuming sulfuric acid (20% $SO_3$) at 23–25° C., and the solution is kept at this temperature for three hours, after which it is raised to 45° C. and kept there for one hour. The reaction mixture is then added to ice and the precipitated dyestuff is filtered off and washed with sodium chloride solution until free of mineral acidity. The wet filter cake is slurred in water, neutralized with soda ash, and the sodium salt of the dye is salted out and filtered off. After drying, the dye is obtained in good yield as purple product. It dyes animal and vegetable fiber bright blue tints of good light fastness.

Instead of raising the temperature to 45° C., as in the procedure above, the reaction mixture may be diluted with concentrated sulfuric acid to produce a monohydrate solution, or the dye may first be isolated in dry form as described above, and then added to monohydrate. In the former case the addition of some sodium chloride is preferable. In both cases, the reaction mixture is kept at 50–100° C. for about one hour, drowned in ice and isolated in the above-described manner. Noticeably redder shades of blue are obtained by this treatment at higher temperature.

Similar redder shades of blue are obtained by substituting 30% oleum for the 20%. By substituting 2% oleum for 20% oleum in the above examples, somewhat greener shades are obtained. The yields are in all cases about the same.

A siimlar dye is obtained by using chlorosulfonic acid instead of the oleum in the above example. This dye may be redissolved in monohydrate at temperatures from 65°–100° C. as in the above example, and isolated in the same manner, resulting in a similar change in shade towards a reddish-blue.

*Example 2*

Five parts of the dark condensation product as obtained in the first step in Example 1 are added to 100 parts of sulfuric acid monohydrate, and the reaction mixture is heated to 150° C. and kept there for one-half hour. The dye is isolated as a sodium salt as described in Example 1. The dye is obtained in good yield as a dark powder. It dyes animal and vegetable fibers bluish-gray tints of good light fastness.

*Example 3*

Example 1 is repeated, except that tetrachlorobenzoquinone is replaced by the molecular equivalent of toluquinone. The dye is obtained in good yield as a dark purple powder. It dyes animal and vegetable fibers in bluish-gray tints of good light fastness.

*Example 4*

Example 1 is repeated, except that tetrachloro-benzoquinone is replaced by the molecular equivalent of benzoquinone. The dye is obtained in good yield as a dark powder. It dyes animal and vegetable fibers bluish-gray tints of good light fastness.

*Example 5*

Example 1 is repeated, except that the tetrachloro-benzoquinone is replaced by the molecular equivalent of 2:5-dichloro-benzoquinone. The dye is obtained in good yield as a dark powder. It dyes animal and vegetable fibers bright blue tints of good light fastness.

*Example 6*

Example 1 is repeated, except that the tetrachloro-benzoquinone is replaced by the equivalent quantity of tetrabromo-benzoquinone. The dye is obtained in good yield as a dark powder. It dyes animal and vegetable fibers in blue tints of good light fastness.

The 6(4'-amino-2'-sulfophenyl)-amino-2,3-dihydroxy-quinoxaline, employed as initial material in Example 1, may be prepared by starting with 1,2-diamino-4-nitro-benzene and condensing this with oxalic acid to give 6-nitro-2,3-dihydroxy-quinoxaline. The latter is then reduced to the corresponding 6-amino-compound, condensed with 4-nitro-1-chlorobenzene-2-sulfonic acid and then again subjected to reduction to produce the corresponding 4-amino-compound.

The requisite initial diamino-nitrobenzene may be prepared by partial reduction of 1-amino-2,4-dinitrobenzene by the aid of sodium sulfhydrate in alcohol. The condensation with oxalic acid to form the intermediate quinoxaline compound may be effected by heating diamino-nitrobenezene with an excess of the acid, following in general the procedure indicated by Hinsberg for various other quinoxaline compounds in Liebig's Annalen, vol. 237, pages 327–372. The condensation of the amino-quinoxaline compound with nitro-chlorobenzene-sulfonic acid may be effected by heating an aqueous solution of the two reagents (in equimolecular ratio) under pressure in the presence of magnesium oxide. Finally, the two reductions of the intermediate nitro compounds to the corresponding amines may be effected in usual manner, as for instances by treating the nitro compound with iron and hydrochloric acid, If oxalic acid in the above condensation is replaced by glyoxal, glyoxal-sulfate, hydroxy-acetic acid, alpha-keto acids in general, chloro-ketones, or any of the other reagents mentioned in said publication of Hinsberg for synthesis with aromatic diamines to produce quinoxalines, analogous nitro-quinoxalines may be obtained to serve as initial materials for the novel dyestuffs of this invention. The following auxiliary examples will illustrate, without limiting, several typical procedures for preparing the nitro-quinoxalines.

*Example 7*

153 parts of 4-nitro-1,2-phenylene-diamine and 400 parts of oxalic are ground together and heated to 125° C. until no more moisture comes off. The melt is then cooled, slurried in 1000 parts of water, made alkaline with soda ash, filtered, and the filter cake is washed free of alkali. The filter cake is then added to 1000 parts of ethanol containing 10 parts of concentrated hydrochloric acid and 300 parts of iron powder. The mixture is refluxed for 16 hours, made alkaline with caustic soda, and the iron sludge is filtered off. Glacial acetic acid is added to the filtrate, and the precipitated 6-amino-2,3-dihydroxy-quinoxaline is filtered off, washed free of acid, and dried.

70.8 parts of this product, 120 parts of water and 88 parts of p-nitro-chlorobenzene-o-sulfonic acid are mixed together, and enough soda ash is added to obtain slight alkalinity to Brilliant Yellow. 8 parts of magnesium oxide are then added, and the mass is heated in a pressure vessel at temperatures ranging from 130 to 142° C. for about 24 hours. The reaction mixture is then diluted with 500 parts of water, the mass is made alkaline to Clayton Yellow paper with caustic soda, and filtered at 60° C. The filtrate is acidified with hydrochloric acid and the precipitate is filtered off and dried.

The brown-colored compound thus obtained is 6(4-nitro-2'-sulfophenyl)-amino-2,3-dihydroxy-quinoxaline and may be represented by the following formula:

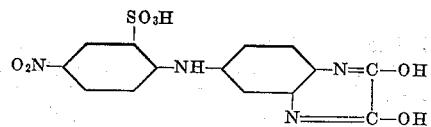

It dissolves readily in alkaline water with a strong Orange color and is precipitated therefrom by the addition of acids.

The above intermediate may be reduced by adding 72 parts of it during one hour to an aqueous suspension of 76 parts of iron powder in 800 parts of water and 20 parts of hydrochloric acid at 100° C. The heating is continued for an additional one-half hour whereupon the reaction mixture is made alkaline with caustic soda and filtered. Addition of acetic acid to the filtrate precipitates 6(4'-amino-2'-sulfophenyl)-amino-2,3-dihydroxy-quinoxaline, which is then filtered off, washed free of acid, and dried. Its conversion into a dioxazine color may be carried out according to the aforegoing examples.

*Example 8*

To 45.9 parts of 4-nitro-1,2-phenylene-diamine in 400 parts of alcohol are added gradually 18.3 parts of mono-chloro-acetone, and the mixture is refluxed for 16 hours. 200 parts of ice water are added, and the precipitate is filtered off. The nitro compound thus obtained is reduced in the same manner as in Example 7 above, and a gray-colored compound is obtained which contains a diazotizable amino group and is believed to be (6 or 7)-amino-2-methyl quinoxaline as represented by the following formula:

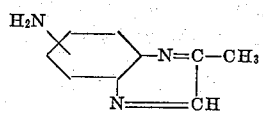

Transformation of this into a dioxazine compound by the aid of 4-nitro-1-chlorobenzene-2-sulfonic acid and chloranil according to the steps set forth in Examples 7 and 1 above, results in a dyestuff dyeing cotton a blue shade.

*Example 9*

6-amino-quinoxaline is prepared from the corresponding nitro body by reduction with iron and acid, as described above under 6-amino-2:3-dihydroxy-quinoxaline. The gray compound isolated contains a diazotizable amino group, and when converted into a dioxazine dyestuff according to Examples 7 and 1 above (using chloranil) it gives blue dyeings on cotton.

*Example 10*

21.2 parts of 4-nitro-1,2-phenylene-diamine and 12.2 parts of chloro-acetic-ethyl-ester are heated on the water bath for 4 hours and added to 100 parts of water at 60° C. containing sufficient caustic soda to make the mixture alkaline to Brilliant Yellow. Air is now passed through the reaction mixture, whereby the intermediate product is oxidized to form (6 or 7)-nitro-2-hydroxy-quinoxaline. The reaction mixture is neutralized with acetic acid and the precipitate is filtered off. The nitro compound is reduced in the same manner as described above under 6-amino-2:3-dihydroxy-quinoxaline. A gray solid is obtained, containing a diazotizable amino group, and having the probable formula

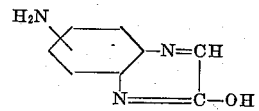

The dioxazine dyestuff derived from this compound according to Examples 7 and 1 above, dyes cotton in blue shades.

*Example 11*

To 14 parts of 4-nitro-1,2-phenylene-diamine in 400 parts of alcohol are added gradually 17 parts of mono-bromo-acetophenone, and the mixture is refluxed for 16 hours. 200 parts of ice water are then added and the precipitate is filtered off and reduced in the same manner as described above under the 6-amino-2:3-dihydroxy-quinoxaline. The gray solid thus obtained contains a diazotizable amino group and is believed to be (6 or 7)-amino-2-phenyl-quinoxaline. The dioxazine dyestuff derived therefrom according to Examples 7 and 1 above dyes cotton a blue shade.

In the above examples, if 2:5-dichloro-benzo-quinone is used instead of tetrachloro-benzoquinone, similar shades are obtained, while benzoquinone and toluquinone produce bluish-grays in all cases.

Similar intermediate products suitable for condensation with nitro-chlorobenzene-sulfonic acid and subsequent conversion into dioxazine type dyes are:

- 6-amino-2:3-diphenyl-quinoxaline (Ann. 292, page 254)
- (6- or 7-)amino-2-carboxy-3-hydroxy-quinoxaline
- 6-amino-2:3-dicarboxy-quinoxaline
- (6- or 7-)amino-2-methyl-3-hydroxy-quinoxaline
- (6- or 7-)amino-2-phenyl-3-hydroxy-quinoxaline.

The requisite nitro quinoxaline compounds, from which the above-listed amino compounds are made by reduction, may be prepared by applying to 4-nitro-1,2-phenylene-diamine the methods described in Ann. 357, pages 351 to 370 for the conversion of 4-methyl-o-phenylene-diamine to the corresponding quinoxaline derivatives.

It will be clear that the above examples are merely illustrative of the many combinations obtainable from the above-described products. For instance, instead of using chloro-benzoquinones and toluquinone, longer chain alkylated benzoquinones may be used.

According to the present invention, a large number of new dioxazine colors of desirable shade and unusual light fastness are produced. Our new dyes show good cotton affinity and light fastness. Furthermore, in those cases where the quinoxaline compound has a hydroxy group adjacent to a hydroxy or carboxy group, it is possible to enhance the fastness properties of the dye by producing on the fiber its metal complex, such as the copper, nickel, cobalt, or chromium complex. A convenient method of forming these metal complexes in situ involves the after-treatment of the dyed fiber with aqueous solutions of a water-soluble metal salt of the selected metal in the usual manner.

I claim:

1. Dioxazine dyestuffs of the group obtainable by ring-closing a quinone diamine of the general formula

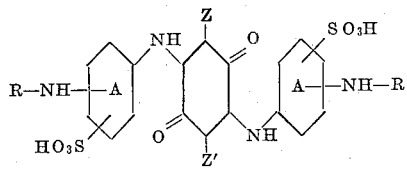

wherein each of the benzene radicals marked A has at least one free ortho position, and wherein Z and Z' individually represent a substituent selected from the group consisting of hydrogen, halogen and alkyl, while R is the radical of a quinoxaline compound attached to the NH group through its Bz-ring.

2. Dioxazine dyestuffs of the group obtainable by causing a ring-closing agent selected from the group consisting of sulfuric acid, oleum and chlorosulfonic acid to react upon a quinone diamine of the general formula

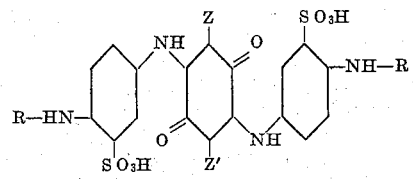

wherein Z and Z' represent substituents from the group consisting of hydrogen, halogen and alkyl, while R is the radical of a compound of the formula

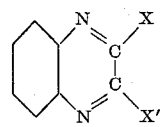

wherein X and X' are each substituents chosen from the group consisting of hydrogen, hydroxy, carboxy, lower alkyl and lower aryl said radical R being attached to the NH group through its Bz-ring.

3. Dioxazine dyestuffs of the group obtainable by causing a ring-closing agent selected from the group consisting of sulfuric acid, oleum and chlorosulfonic acid to react upon a quinone diamine of the formula

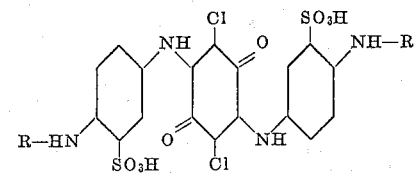

wherein R is the radical of 2,3-dihydroxy-quinoxaline, which is attached to the NH group above shown in the 6-position of the quinoxaline radical.

4. A dioxazine dyestuff as defined in claim 3, except that R is the radical of quinoxaline attached to the NH group through its Bz-ring.

5. A dioxazine dyestuff as defined in claim 3, except that R is the radical of 2-methyl-quinoxaline attached to the NH group through its Bz-ring.

6. In the process of preparing a dioxazine dyestuff, the step which consists of reacting a benzoquinone with substantially two molal proportions of an amino-diaryl-amine sulfonic acid of the formula

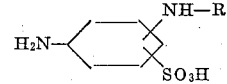

wherein at least one of the positions ortho to the $NH_2$ group is free, and wherein R is the radical of a quinoxaline compound attached to the NH group through its Bz-ring.

FRITHJOF ZWILGMEYER.

CERTIFICATE OF CORRECTION.

Patent No. 2,355,496.

August 8, 1944.

FRITHJOF ZWILGMEYER.

It is hereby certified that error appears in the printed specification of the above numbered patent requiring correction as follows: Page 1, second column, line 30, in the formula, "NH-R" should be connected to the benzene ring by a bond; page 2, second column, line 73, for the word "instances" read --instance--; page 3, first column, line 15, after "oxalic" insert --acid--; line 43, for "6(4-nitro" read --6(4'-nitro--; and that the said Letters Patent should be read with this correction therein that the same may conform to the record of the case in the Patent Office.

Signed and sealed this 26th day of September, A. D. 1944.

Leslie Frazer (Seal)  —  Acting Commissioner of Patents.